(12) United States Patent
Cox et al.

(10) Patent No.: US 10,879,758 B2
(45) Date of Patent: Dec. 29, 2020

(54) ELECTRIC MACHINE ARRANGEMENT

(71) Applicant: AUDI AG, Ingolstadt (DE)

(72) Inventors: Jason Cox, Ingolstadt (DE); Andreas Schlinke, Böhmfeld (DE)

(73) Assignee: AUDI AG, Ingolstadt (DE)

( * ) Notice: Subject to any disclaimer, the term of this patent is extended or adjusted under 35 U.S.C. 154(b) by 308 days.

(21) Appl. No.: 16/185,721

(22) Filed: Nov. 9, 2018

(65) Prior Publication Data
US 2019/0199159 A1 Jun. 27, 2019

(30) Foreign Application Priority Data

Dec. 21, 2017 (DE) .................... 10 2017 223 491

(51) Int. Cl.
| | |
|---|---|
| *H02K 5/20* | (2006.01) |
| *H02K 9/193* | (2006.01) |
| *H02K 24/00* | (2006.01) |
| *H02K 11/21* | (2016.01) |
| *H02K 5/10* | (2006.01) |

(Continued)

(52) U.S. Cl.
CPC .............. *H02K 5/20* (2013.01); *H02K 5/10* (2013.01); *H02K 9/193* (2013.01); *H02K 11/21* (2016.01); *H02K 11/225* (2016.01); *H02K 16/00* (2013.01); *H02K 24/00* (2013.01); *H02K 2205/09* (2013.01)

(58) Field of Classification Search
CPC .......... H02K 5/20; H02K 11/21; H02K 24/00; H02K 2205/09

See application file for complete search history.

(56) References Cited

U.S. PATENT DOCUMENTS 5,743,347 A * 4/1998 Gingerich ........... B60L 15/2036
  180/65.1
5,829,542 A * 11/1998 Lutz ..................... B60K 17/046
  180/65.6

(Continued)

FOREIGN PATENT DOCUMENTS

| CN | 1744411 A | 3/2006 |
|---|---|---|
| CN | 102438852 A | 5/2012 |

(Continued)

OTHER PUBLICATIONS

Examination Report dated Jul. 31, 2018 in corresponding German Application No. 102017223491.1; 10 pgs.

(Continued)

*Primary Examiner* — Robert W Horn
(74) *Attorney, Agent, or Firm* — Maier & Maier, PLLC

(57) ABSTRACT

An electric machine arrangement, with two electric machines, each with a housing, wherein each housing has a machine space with a rotor-stator assembly and a resolver space section forming part of a resolver space that is formed between the machine spaces and is sealed off from the machine spaces. The housings are interconnected with their resolver space sections adjoining each other and complementing each other to form the resolver space. Several pressure equalizing elements are provided, and between the resolver space and at least one of the adjoining machine spaces, a pressure equalizing element is arranged, so that the pressure equalization occurs between the resolver space and the coupled machine space.

5 Claims, 2 Drawing Sheets

(51) Int. Cl.
*H02K 11/225* (2016.01)
*H02K 16/00* (2006.01)

(56) References Cited

U.S. PATENT DOCUMENTS

| | | | | |
|---|---|---|---|---|
| 5,915,488 | A * | 6/1999 | Fliege | B60L 3/04 180/65.22 |
| 5,932,942 | A * | 8/1999 | Patyk | H02K 11/33 310/58 |
| 6,089,341 | A * | 7/2000 | Gingerich | B60L 15/2036 180/65.1 |
| 7,686,726 | B2 * | 3/2010 | Thompson | B62D 11/16 475/150 |
| 9,837,876 | B2 * | 12/2017 | Ishimaru | H02K 11/215 |
| 10,064,302 | B2 * | 8/2018 | Friedlund | H05K 7/026 |
| 10,615,668 | B2 * | 4/2020 | Yang | H02K 5/20 |
| 2006/0125240 | A1 * | 6/2006 | Kato | F02N 11/04 290/31 |
| 2007/0012505 | A1 * | 1/2007 | Walter | H02P 25/22 180/444 |
| 2010/0133835 | A1 * | 6/2010 | Dooley | H02K 1/2786 290/52 |
| 2012/0242137 | A1 | 9/2012 | Fischer et al. | |
| 2012/0258831 | A1 | 10/2012 | Knoblauch et al. | |
| 2013/0241458 | A1 * | 9/2013 | Soma | H02K 11/33 318/495 |
| 2014/0011625 | A1 * | 1/2014 | Thompson | B60K 17/043 475/225 |
| 2014/0077633 | A1 * | 3/2014 | Nagao | H02K 9/19 310/54 |
| 2014/0333162 | A1 | 11/2014 | Karlsson et al. | |
| 2016/0297385 | A1 | 10/2016 | Hoshinoya et al. | |
| 2019/0199159 | A1 * | 6/2019 | Cox | H02K 11/225 |
| 2020/0282827 | A1 * | 9/2020 | Kaltenbach | B60K 17/06 |

FOREIGN PATENT DOCUMENTS

| | | |
|---|---|---|
| DE | 4240044 A1 | 6/1994 |
| DE | 10039618 A1 | 3/2002 |
| DE | 102009036299 A1 | 2/2011 |
| DE | 202009014189 U1 | 3/2011 |
| DE | 102010049610 A1 | 6/2011 |
| DE | 102010064010 A1 | 6/2012 |
| DE | 112010000429 T5 | 6/2012 |
| JP | 2006298314 A | 11/2006 |

OTHER PUBLICATIONS

Chinese Office Action dated Jun. 19, 2020, in connection with corresponding CN Application No. 201811561142.X (9 pp., including machine-generated English translation).

* cited by examiner

ELECTRIC MACHINE ARRANGEMENT

FIELD

The invention relates to an electric machine arrangement, comprising two electric machines, each having a housing, wherein each housing has a machine space with a rotor-stator assembly and a resolver space section forming part of a resolver space which is formed between the machine spaces and is sealed off from the machine spaces, wherein the housings are interconnected with their resolver space sections adjoining each other and complementing each other to form the resolver space, wherein several pressure equalizing elements are provided and associated with the machine spaces and the resolver space.

BACKGROUND

Such an electric machine arrangement is used, for example, as the rear axle drive in a motor vehicle driven by an electric motor. The electric machine arrangement comprises two separate electric machines, one of which drives the right sub-axle and thus the right rear wheel and the other of which drives the left sub-axle and thus the left rear wheel. Each electric machine comprises a housing, usually fabricated of cast metal, while a rotor-stator assembly is accommodated in a pot-shaped recess, forming a machine space. This space may be bathed in a coolant flow in order to cool the electric machine or the working components. In order to create an enclosed coolant space that is uniform for the electric machine arrangement, the housings are fastened to each other by their open end faces, so that, on the one hand, the resolver space is formed and enclosed, while, on the other hand, the machine spaces are also interconnected. Usually, the two rotor-stator assemblies are interconnected by a common rotor shaft through which a coolant can flow.

In order to enable a pressure equalization between the interior of the housing and the surroundings, a plurality of pressure equalizing elements are provided. Thus, each machine space can be vented to the surroundings by way of at least one pressure equalizing element, and the resolver space can likewise be vented to the surroundings by way of at least one pressure equalizing element. The pressure equalizing elements are provided on the lateral surface of the respective housing. The pressure equalizing element or elements that are assigned to the resolver space are situated in the region of the intersection of the two housings, due to the fact that the two housings are geometrically identical, yet arranged shifted by 180° relative to each other. Consequently, each pressure equalizing element constitutes an interface to the surroundings.

SUMMARY

The object that is the basis for the invention is to indicate an improved electric machine arrangement compared to the prior art.

In order to achieve this object in an electric machine arrangement of the kind mentioned above, it is provided according to the invention that between the resolver space and at least one of the adjoining machine spaces there is arranged a pressure equalizing element, so that the pressure equalization occurs between the resolver space and the coupled machine space.

Unlike what has been produced previously, the pressure equalization does not occur between resolver space and surroundings, but rather between resolver space and at least one of the adjacent machine spaces. That is, the pressure equalizing element is situated in a partition wall that separates the resolver space from the adjacent machine space. This means that the number of interfaces with the surroundings is reduced, since the pressure of the resolver space is equalized virtually internally in the housing. Any excess pressure in the resolver space is thus equalized relative to the machine space, wherein any excess pressure possibly existing there can be equalized relative to the surroundings by way of the pressure equalizing element on the side of the machine space. Thanks to the reduction in the interfaces with the outside, the danger of moisture getting into the interior of the assembly by way of such a pressure equalizing element can be reduced.

Preferably, the resolver space is coupled to both machine spaces, each time by way of a respective pressure equalizing element, so that a possible venting into both machine spaces is possible.

According to an especially expedient enhancement of the invention, it is provided that the pressure equalizing element or both elements that couple the resolver space to the machine space or spaces is or are arranged above a collection section for leakage water that is provided in the resolver space. The resolver space is formed with a collection section provided at the bottom in the resolver space, in which any leakage fluid, usually a coolant liquid, that may enter, for example, through bearing locations at which the rotor shafts are mounted on the partition wall separating the resolver space from the adjacent machine space, can be collected. Now, if the pressure equalizing element or elements are situated above this collection section according to the invention, then despite the venting of the resolver space to the machine space or spaces within the housing, it is prevented that any leakage fluid from the resolver space or the collection section can enter into the respective machine space, i.e., the active space containing the rotor-stator assembly. That is, a leakage from the resolver space to the machine or active space or spaces is prevented.

As described, each machine space can be vented to the surroundings by at least one pressure equalizing element. In terms of position, it is expedient for the pressure equalizing elements to be situated at positions above a fording line, i.e., a line up to which the vehicle can be immersed in water without its function being impaired.

Since, as mentioned, the two machine housings are identical, and merely arranged in mirror image to each other, the design of the housing should choose appropriately the position of the respective compartments in which the pressure equalizing elements are positioned, so that in the assembled state, the pressure equalizing elements are positioned high enough.

In this case, it is expedient for the pressure equalizing elements by which the machine spaces can be vented to be situated at the mutually opposite end faces of the housings. The end faces of the housings are closed by corresponding housing covers. These housing covers, which are of course made tight by corresponding sealing means or sealing elements—just like the two housings are made tight against each other in the region of the central intersection—can be easily equipped with the corresponding receptacles for one or possibly also multiple pressure equalizing elements for each machine half, so that the appropriate positioning of the pressure equalizing elements at an appropriate housing height can be easily realized.

In addition to the electric machine arrangement itself, the invention also relates to a motor vehicle comprising such an electric machine arrangement, especially as a rear axle drive.

BRIEF DESCRIPTION OF THE DRAWINGS

Further advantages and features of the invention will emerge from the exemplary embodiment described below, as well as based on the drawing. Shown therein are.

DETAILED DESCRIPTION

Figure 1:
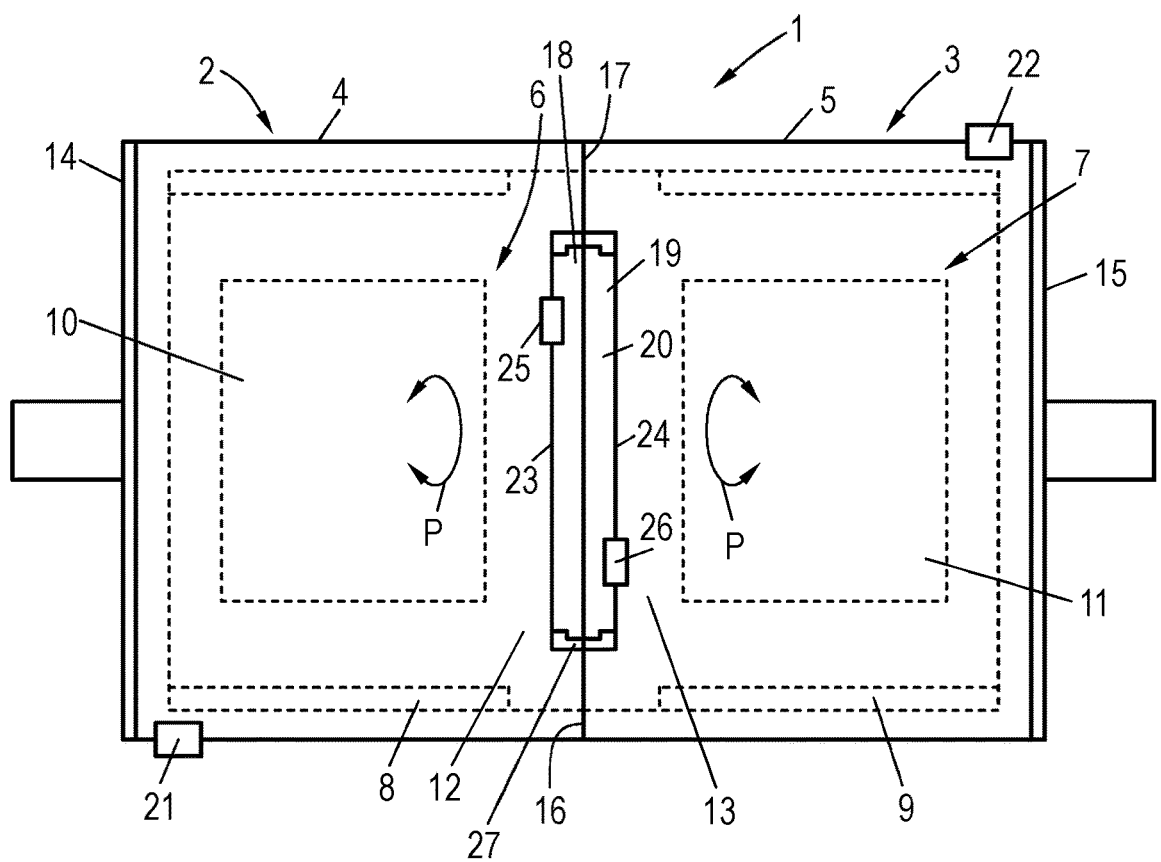
FIG. 1 a schematic diagram of an electric machine arrangement of a first embodiment according to the invention, and FIG. 2 a schematic diagram of an electric machine arrangement of a second embodiment according to the invention.

FIG. 1 shows a schematic diagram of an electric machine arrangement 1 according to the invention, comprising a first electric machine 2 and a second electric machine 3. Each electric machine 2, 3 has a housing 4, 5, in which a corresponding rotor-stator assembly 6, 7 is taken up, comprising a stator 8, 9 and a rotor 10, 11 in each case.

Each housing 4, 5 is more or less pot-shaped and open on one side, so that each housing 4, 5 has a machine space 12, 13, in which the respective rotor-stator assembly 6, 7 is received. The rotor 10, 11 is arranged, of course, in known manner on a corresponding driven shaft, in order to drive the respective wheel coupled to the driven shaft. This rotates inside the respective stator 8, 9, as shown by the double arrows P.

At the end faces at a distance from each other, the respective housing 4, 5 has a closing cover 14, 15. With their abutting end faces 16, 17, the two housings 4, 5 lie against each other. In this region, the two housings 4, 5 are configured such that each housing has a resolver space section 18, 19, the two resolver space sections 18, 19 complementing each other to form a resolver space 20 situated in the middle between the two machine spaces 12, 13. There is received here, in known manner, a mechanism for positional resolution of the position of the respective rotor 10, 11 relative to the stator 8, 9.

The fundamental structure and function of such an electric machine arrangement is rather well known. FIG. 1 is a purely schematic diagram to explain the basic components.

Two pressure equalizing elements 21, 22, are represented, which are associated with the two machine spaces 12, 13. One pressure equalizing element 21, 22 is shown in each case, but, of course, several such pressure equalizing elements may also be provided at the respective housings 4, 5, each being associated with one of the machine spaces 12, 13. The pressure equalizing elements 21, 22 are arranged in the circumferential wall sections of the housing 4, 5, i.e., at the top and bottom. In the housings 4, 5, corresponding receptacles are formed, in which the corresponding pressure equalizing elements 21, 22 are installed. At this place, it should be pointed out that the two housings 4, 5 are identical in design, yet situated in a mirror image arrangement to each other. That is, only one housing type needs to be kept in stock in order to form the electric machine arrangement 1, the housings 4, 5 being merely arranged with their end faces 16, 17 reversed. Thanks to the pressure equalizing elements 21, 22, any excess pressure inside the machine spaces 12, 13 can be dissipated to the surroundings, i.e., a venting can occur.

Any excess pressure in the resolver space 20 can also be equalized, but not to the surroundings, as has been the case previously, but instead, into one of the two machine spaces 12, 13. For this purpose, at least one pressure equalizing element 25, 26 is arranged in the corresponding partition wall 23, 24 separating the resolver space 20 from the machine space 12 or 13. Thanks to the pressure equalizing elements 25, 26, any excess pressure in the resolver space 20 can be dissipated either into the machine space 12 or the machine space 13, and any excess pressure in the respective machine space 12, 13 can then be dissipated via the pressure equalizing elements 21, 22 to the surroundings. That is, the resolver space 20 is vented internally in the housing, and no interface with the surroundings is needed, as was formerly the case. The pressure equalizing elements 25, 26 likewise are situated opposite each other, due to the fact that the two housings 4, 5 are identical, yet arranged as mirror images of each other.

Furthermore, there is situated in the resolver space 20 a collection section 27 for any leakage water that may penetrate into the resolver space from the coolant circuit that is created inside the electric machine arrangement 1. The machine spaces 12, 13 are interconnected so that any coolant ducts or the machine spaces 12, 13 themselves complement each other or communicate with each other so that a coolant can flow through the coolant ducts or the machine spaces 12, 13 themselves in order to cool the particular rotor-stator assembly 6, 7. The coolant can only circulate within the housings 4, 5, that is, these housings have more or less a common closed coolant circuit. But it is also conceivable to supply coolant at the housing 4, for example, and to drain it at the housing 5 and introduce it into a cooling device, from which it is then supplied once more to the housing 4. That is, in this case the electric machine arrangement 1 would be involved in an external coolant circuit. By way of this coolant circuit, whether internal or external, it is possible for coolant to penetrate into the sealed-off resolver space 20, for example, at bearing locations where the rotor shafts are mounted, for example, on the housing walls 23 or 24. This [coolant]*then collects in the region of the collection section 27. Obviously, since the lower pressure equalizing element 26 is situated above this collection section 27, its positioning will advantageously prevent any leakage fluid from getting from the collection section 27 via a pressure equalizing element into the respective adjacent machine space 12, 13.

Figure 2:
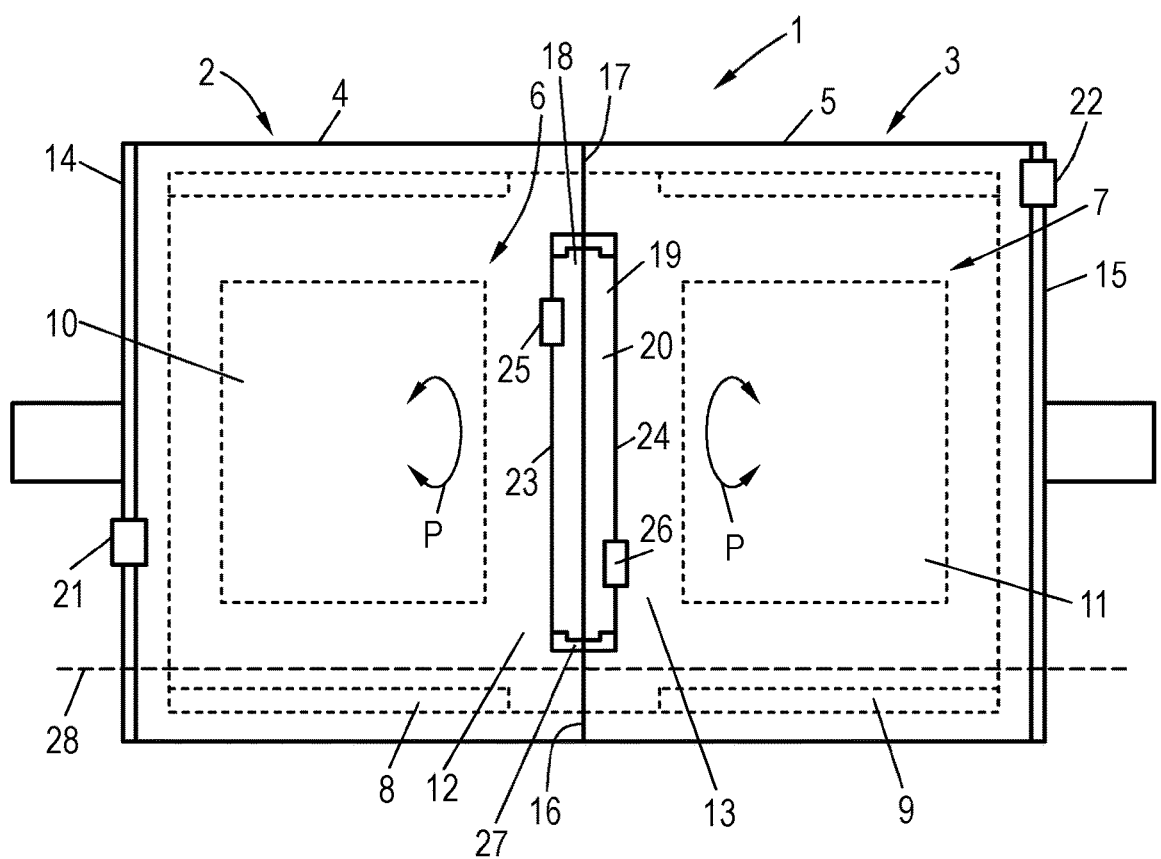

FIG. 2 shows an embodiment of an electric machine arrangement 1 according to the invention, corresponding to the one in FIG. 1. The only difference is that in the embodiment of FIG. 2 the two pressure equalizing elements 21, 22 are arranged not on the respective cylindrical wall section of the housing 4, 5, but rather on the housing cover 14, 15, i.e., at the end face. Hence, as compared to the assembly of FIG. 1, they are situated somewhat higher (in the case of the pressure equalizing element 21) or lower (in the case of the pressure equalizing element 22), as compared to the embodiment of FIG. 1. The lower pressure equalizing element 21 is located in a position that lies above a fording line 28. This fording line is a height up to which the electric machine arrangement can be driven underwater, without being subject to functional impairment. Because the pressure equalizing element 21 is positioned above this fording line 28, water is prevented from penetrating into the respective associated machine space when the electric machine arrangement 1 is submerged in water above the pressure equalizing element 21.

The invention claimed is:

1. An electric machine arrangement, comprising:
   two electric machines each with a housing, wherein each housing has a machine space with a rotor-stator assembly and a resolver space section forming part of a resolver space that is formed between the machine spaces and is sealed off from the machine spaces, wherein the housings are interconnected with their resolver space sections adjoining each other and complementing each other to form the resolver space, wherein several pressure equalizing elements are provided and associated with the machine spaces and the resolver space, wherein between the resolver space and at least one of the adjoining machine spaces, at least one of the pressure equalizing elements is arranged, so that the pressure equalization occurs between the resolver space and the coupled machine space.

2. The electric machine arrangement as claimed in claim 1, wherein that the resolver space is coupled to both machine spaces by way a respective pressure equalizing element in each case.

3. The electric machine as claimed in claim 1, wherein the at least one pressure equalizing element is or are arranged above a leakage water collection section provided in the resolver space.

4. The electric machine arrangement as claimed in claim 1, wherein the two pressure equalizing elements by way of which the machine spaces can be vented are situated above a fording line, when viewed in the vertical direction of the electric machine arrangement.

5. The electric machine arrangement as claimed in claim 4, wherein the pressure equalizing elements by way of which the machine spaces can be vented are situated at the mutually opposite end faces of the housings.

* * * * *